March 11, 1952 P. F. DOUGHERTY 2,588,812
WAX CAKE
Filed June 27, 1950
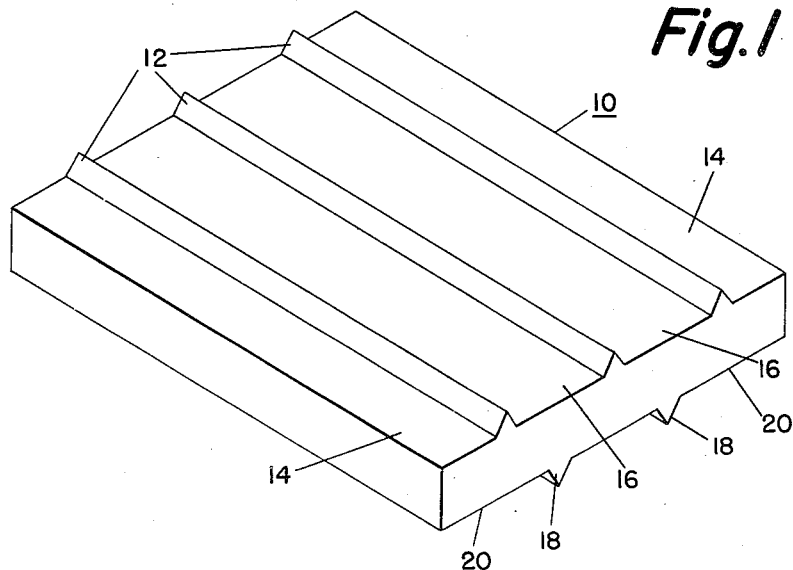
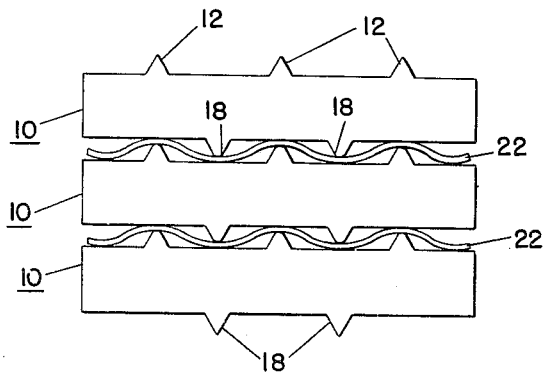
INVENTOR.
PATRICK F. DOUGHERTY
BY
Busser and Harding
ATTORNEYS Patented Mar. 11, 1952

2,588,812

UNITED STATES PATENT OFFICE 2,588,812

WAX CAKE

Patrick F. Dougherty, Chester Heights, Pa., assignor to Sun Oil Company, Philadelphia, Pa., a corporation of New Jersey Application June 27, 1950, Serial No. 170,583

2 Claims. (Cl. 196—149)

This invention relates in general to wax cakes and particularly to the shaping of wax cakes for packing and storing, and to facilitate their use in industry.

In preparing wax for sale to consumers, it is ordinarily required that a cake or slab have a specified weight which determines the dimensions. The simplest form is rectangular in shape and is generally accepted by consumers. Originally, due to the unusual characteristics of wax, these rectangular cakes were cast in chilled molds and later were extruded. In either case, the packaging and shipment of this article of commerce presented and still presents a problem. Under normal conditions of temperature and pressure the flat, bearing surfaces of the cakes tend to stick together making it difficult for th consumer to separate them for use in variou processes. Separators or dividers have been used in various forms of finished papers and packing board. These separators have been either of no value or only partially successful. Waxes of lower melting points, designed especially for coating paper food containers, stick to the separators forming a solid mass. Separation of the individual cakes leaves pieces of paper sticking to the cakes which requires time and labor to remove. To reduce the expense of unusual and costly materials, an acceptable inexpensive paper separator has not been found.

It is an object of this invention to provide a wax cake shaped to minimize the pressure areas contacting the separators between the cakes, and to facilitate the removal of any pieces of the separating material which might adhere to them.

Suggestions have been made to alter the shape of the wax cake to minimize the area of the contact surfaces. One such idea is included in a patent to L. H. Macomber, No. 2,099,213. These suggestions usually assume a form which differs greatly from the rectangularly shaped cake industry is accustomed to handle in particular processes and may not be acceptable.

In addition to possible rejection by the consumer, such a shaped cake requires complete replacement of the manufacturer's equipment and production methods. This places a heavy financial burden on the manufacturer which may be a total loss if the product is not acceptable. It is a further object of the invention to provide a wax cake conforming in general size and dimension closely to those now used, and to require a minimum of change in manufacturing equipment.

The changes in the shape of the wax cakes suggested to date are further objectionable in that the effort to reduce the effective contact area between the cakes results in such a decrease of needed support that the cakes sag. This results in additional surface areas coming into contact during shipping or storage and forms an unacceptable commercial article. It is still a further object of this invention to provide a wax cake shaped to support like cakes under normal handling conditions.

A structure which illustrates the prepared embodiment of the invention is shown in the accompanying drawing, in which:

Figure 1 is a perspective view of an improved wax cake.

Figure 2 is an end view of several improved cakes forming a partial stack or package.

The reasons for wax cakes sticking together have been found to be: (a) the physical properties of the wax, (b) the method of packaging, (c) conditions of storage and shipment, and (d) the physical condition of the cake contact surfaces. Of these, the one unalterable condition or reason is (a) the physical properties of the wax. The specification of the purchaser determines the required physical properties and must be followed if the wax is to be sold.

The packaging and handling conditions can be regulated, but only at added and continued cost. Therefore, the one remaining reason for sticking which can be corrected is the alteration of the physical condition of the cake contact surfaces. A minimum of shape change to decrease the contact area between the cakes, and consequently the separators, will avoid costly packaging methods and require no changes in handling methods.

Referring to the drawing, numeral 10 shows the wax cake generally conforming to the accepted size and shape of the commercially accepted product. A plurality of parallel, uniformly shaped and dimensioned ridges 12, preferably of triangular cross-section, are fashioned on the upper surface of the cake by slight modification of the molds or extruding nozzles at the time of manufacture. These ridges on the now described face of the cake are spaced from, and parallel to, the edges of the cake as at 14 and have spaces 16 between the adjacent ridges wider than the base of the ridges 12. On the opposite face a plurality of like ridges 18, parallel to ridges 12 on the first described face, are arranged in staggered formation to those already described so that they are opposite to the spaces 16 above them. They, too, are arranged to be spaced from the edge of the cake to leave spaces 20 between the outside ridges 18 for the purpose discussed later.

It is not intended that the specific numbers of three ridges on the upper face and two ridges on the lower face be the limits of this disclosure. The drawing in Figure 1 illustrates one preferred form of cake, but the general design may be modified by increasing the number of ridges although those shown appear to be the maximum required. The spacing, however, as defined between the ridges must be followed as will appear in discussing the next figure.

Figure 2 shows a partial stack or package with a number of uniformly molded or extruded cakes with the disclosed ridge structure. It will be evident that when formed in the preferred shape, or similarly as suggested, the ridges 12 and 18 are in alignment, do not touch each other and afford a complete support to keep the cakes from sagging. A single, paper separator 22 is inserted between the cakes and is shown covering the ridges and the spaces between them. The surface of the separator which is in contact with either of the cakes it divides is kept at a minimum and presents no difficulty in separation or in removing any piece of the paper which might stick to the surface. The ridged surface is maintained during handling and presents a roughened area easily cleaned.

Under conditions of normal temperature and pressure the ridges 12 and 18 will burr over and become slightly rounded, but will not lose sufficient of the initial structure to permit adhesion between increased areas of the cakes. The production of uniform cakes as described gives the added advantage of presenting a similarly reduced bearing surface both on the top and bottom of the stack as shown which supports the container free of the wax cake surface during shipment, and keeps the cakes free of stacking surfaces such as pallets when piled as in a warehouse. This prevents the container from adhering to the wax surface and keeps the wax cake comparatively free from sticking paper or cardboard.

It is noted particularly, in describing the preferred embodiment of the cake, that the ridges 12 and 18 on both faces are set in from the edges of the cake which they parallel by spaces 14 and 20 respectively. This construction enables the worker handling the wax to readily grasp one or several cakes from a stack on either the ends or sides of the cakes. It also gives a clear line of demarcation between the slabs or cakes which is necessary for those mixing wax for commercial applications where the number of slabs determines a particular dressing or ingredient.

It will be readily recognized by those experienced in the art that the support of the wax cakes by the ridge construction as shown permits a free circulation of air. In addition to keeping the cakes from adhering to each other, the space between the cakes permits a proper cure to retain color and assist cooling. Wax, as is well known, solidifies on the outer surfaces and will present an appearance of a completely solid and well shaped mass yet be molten at the core and for a considerable portion of the interior. This insulating effect of the exterior crystallized surface is the primary reason for a slow production rate of commercial wax cakes and supports the older well known methods of casting in chilled molds. The present demands for increased production, and the possible further increase, requires a development of methods whereby the wax cakes may be fashioned rapidly and then allowed to cool without further attention. This is a particular feature of the disclosed wax cake form and will permit manufacture to be expedited.

From the foregoing explanation it will be understood that the essential feature of the invention is the provision of wax cakes, all of the same length and breadth, with spaced apart ridges on opposite faces, the cakes being adapted to be so arranged in a stack that the opposing faces of each two adjacent cakes have their ridges parallel to, and staggered relative to the ridges of the opposing face of the adjacent cake. In this manner the ridges on the face of one cake will engage flat faces of the opposing face of the adjacent cake in supporting relation.

The described and illustrated invention is particularly applicable to waxes in general and may be used with any type of wax either as illustrated or by slight modification in the increase or decrease of the number of ridges on the cake for waxes of higher or lower melting points. It will be understood that the general disclosure may be varied as conditions of the materials indicate.

I claim:

1. As an article of manufacture a flat elongated cake of wax having a plurality of uniform ridges on one face extending the length of the cake and spaced from the sides thereof and from each other, the space between adjacent ridges being greater than the width of the base of the ridges, a plurality of like ridges on the reverse face parallel to the first mentioned ridges and arranged opposite the spaces of the cake and extending the length thereof and positioned inwardly of the sides thereof and having spaces between the last named adjacent ridges of a width greater than the base of the ridge structure, adapted to support like cakes in packing with the minimum contact surface therebetween.

2. As an article of manufacture as set forth in claim 1 wherein said ridges are triangular in cross-section.

PATRICK F. DOUGHERTY.

REFERENCES CITED

The following references are of record in the file of this patent:

UNITED STATES PATENTS

| Number | Name | Date |
|---|---|---|
| 1,931,595 | Weguelin | Oct. 24, 1933 |
| 1,956,216 | Booth | Apr. 24, 1934 |
| 2,099,213 | Macomber | Nov. 16, 1937 |